May 16, 1950 — H. F. DALGLISH — 2,508,060
LAWN MOWER
Filed Dec. 13, 1945
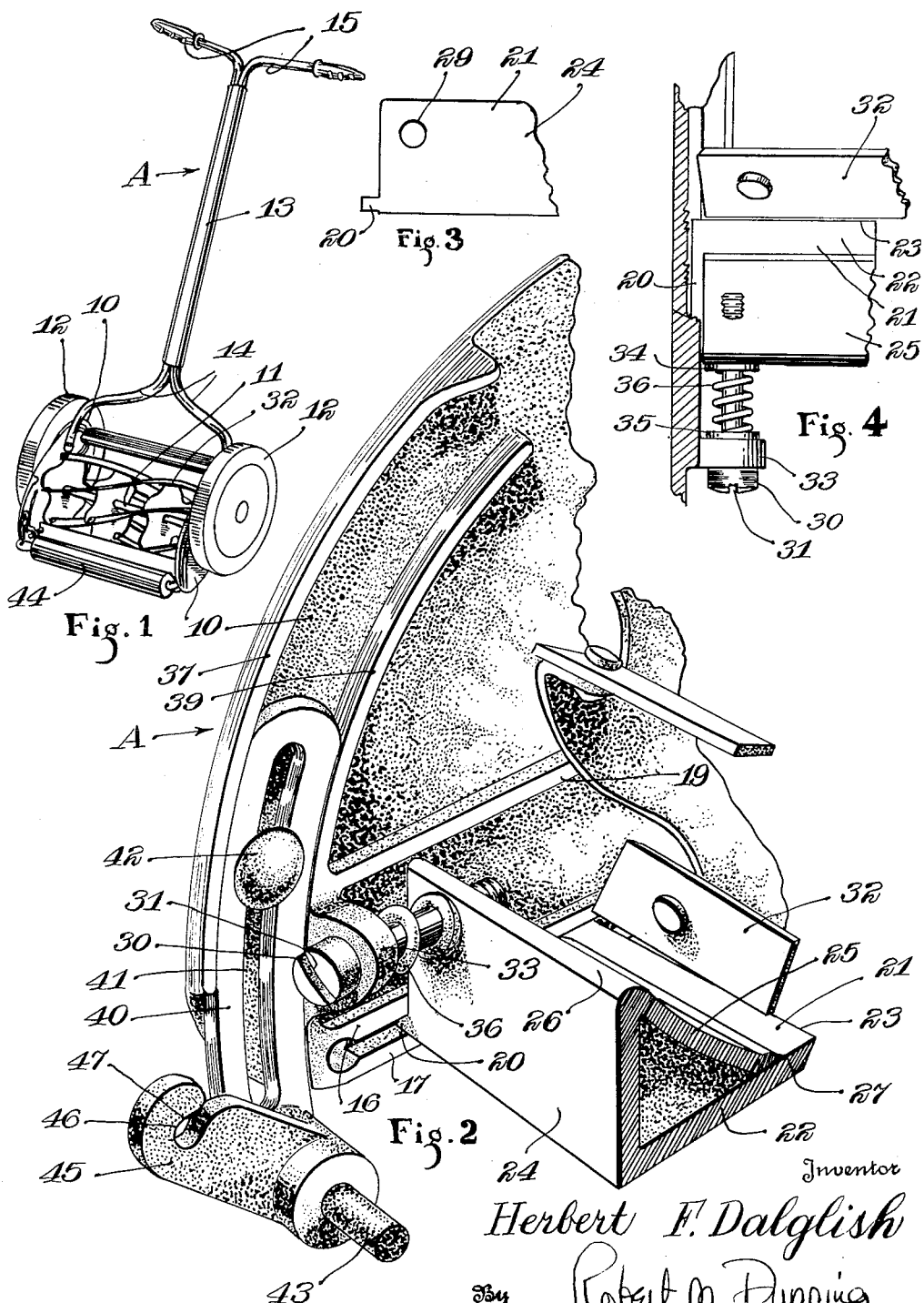
Inventor
Herbert F. Dalglish
By Robert M. Dunning
Attorney Patented May 16, 1950

2,508,060

UNITED STATES PATENT OFFICE 2,508,060

LAWN MOWER

Herbert F. Dalglish, St. Paul, Minn.

Application December 13, 1945, Serial No. 634,661

5 Claims. (Cl. 56—294)

My invention relates to an improvement in lawn mower and deals more particularly in the cutter bar adjustment and roll supporting bracket used in conjunction therewith.

In recent years it has been common practice to manufacture lawn mowers with a rotating reel having cutting blades thereupon and a cutter bar mounted in proximity thereto. The grass is sheared off between the rotating reel and the cutter bar. The cutter bar is usually pivotally supported by the end plates of the lawn mower and is movable in a pivotal direction toward and away from the rotating wheel. Some difficulty is experienced in maintaining the proper adjustment between the cutter bar and the reel. Furthermore the cutter bar often becomes slightly bent or curved so that it is spaced a greater distance from the cutting reel at the center thereof than at the ends.

An object of the present invention lies in the provision of a cutter bar which is movable in a substantially horizontal direction toward or away from the cutting reel. The cutter bar is held by the end plates of a lawn mower so that it may move only in a horizontal direction. As a result once the cutter bar is in proper adjusted position it will remain in adjustment for a considerable period of time. Furthermore the cutter bar is readily adjustable when necessary.

A feature of the present invention lies in slidably supporting the ends of the cutter bar to move toward or away from the cutting reel. Guide means are provided on the end plates of the lawn mower which cooperate with suitable means on the cutter bar to guide the movement thereof.

A feature of the present invention resides in the resilient supporting of the cutter bar in its relation to the cutting reel. The cutter bar is slidably mounted for movement toward and away from the cutting reel. Set screws or similar means are provided to limit the movement of the cutter bar toward the reel. Spring means are provided which urge the cutter bar in extended position. As a result the cutter bar is always resiliently urged into close proximity with the reel. However, should an obstruction tend to become wedged between the cutter bar and the reel the cutter bar may retract away from the reel sufficiently to prevent damage either to the reel or to the cutter bar. In many instances such an obstruction may in this way pass through the lawn mower without greatly impairing the cutting operation.

A further feature of the present invention resides in the manner of supporting the grass roller or rolled down roller to the side plates of the lawn mower frame. I provide a pair of arcuate brackets which are slidably supported to slide between arcuate guides on the lawn mower side plates. This bracket may be held in any adjusted position between the guides. Each of the two opposed guides is provided with an inwardly projecting stub shaft for supporting the grass roller. These stub shafts extend into axial apertures in the ends of the roller and are supported thereby.

A feature of the present invention lies in the provision of an off-set arm on each of the roller supporting brackets for accommodating the ends of a grass catching basket or the like. These arms are provided with hook shaped apertures therein to which the grass catching basket may be attached.

A feature of the present invention resides in the provision of a cutter bar having a "box beam" construction which holds the bar rigid and non-flexible.

A further feature of the present invention resides in forming a cutter bar having a triangular section. The bar is provided with an upstanding flange at the rear edge thereof opposite the cutting edge and the upper edge of this upstanding flange is connected to the blade rearwardly of the cutting edge to form a substantially triangular reinforcing section. As a result the tendency of the blade to curve or warp at the center is obviated.

These and other objects and novel features of my invention will be more clearly and fully set forth in the following specification and claims.

In the drawings forming a part of my specification:

Figure 1 is a perspective view of a lawn mower showing our new design.

Figure 2 is an enlarged detail of one end plate of the lawn mower showing the manner in which the cutter bar is mounted thereon and also showing the roller brackets and the means of supporting the same.

Figure 3 is a rear elevational view of one end of the cutter bar showing the slide guide thereon.

Figure 4 is a top plan view of the cutter bar and its attachment to the side plate of the lawn mower.

The lawn mower A includes a pair of side plates 10 which are held in spaced relation by transverse braces not visible in the drawing. A reel shaft 11 extends between the plates 10 and is operated in any suitable or desired manner by wheels 12. The wheels 12 are usually connected to the shaft 11 through suitable gearing and through a suitable over-running clutch mechanism which allows the reel to continue to rotate after the wheels 12 have stopped motion.

A handle 13 is provided with a bifurcated end 14 connected to the side plates 10 to pivot somewhat relative thereto. Handle bars 15 are provided on the handle 13 by means of which the handle may be conveniently grasped for the cutting operation. All of the structure described above is conventional and is not illustrated in extreme detail.

A pair of spaced ribs 16 and 17 extend horizontally along the inner surface of each end plate 10 near the lower edge thereof. A third rib 19 preferably extends parallel to the ribs 16 and 17 and is spaced above the same. The ribs 16 and 17 are spaced to accommodate an elongated projecting edge 20 on each end of the cutter bar 21. These ribs 16 and 17 fit above and below, respectively, the projecting edge 20, and thus hold the cutter bar 21 for slidable movement in a horizontal direction. Tilting or pivoting of the cutter blade is impossible with such a slidable support.

The cutter bar 21 includes a horizontal flange 22, the forward edge 23 of which is sharpened, preferably at a downwardly and rearwardly inclined angle, as illustrated to provide a cutting edge. A vertical flange 24 is provided on the rear edge of the horizontal flange 22 extending upwardly therefrom. An inclined flange 25 connects the upper edge 26 of the vertical flange 24 with an intermediate point 27 on the horizontal flange 22 at a point spaced from the cutting edge 23.

It will be noted that this construction provides a cutter bar having a body portion which is mainly triangular in cross section with one edge of the triangle projecting forwardly to provide a cutting edge. Such a blade is extremely resistant against bending or flexing and is extremely rigid.

The various flanges 22, 24, and 25 may be formed from a single sheet of steel or other suitable material or may be comprised of separate strips welded or otherwise affixed together.

The rib 19 is designed to engage against the ends of the flanges 24 and 25 to assist in maintaining the cutter bar resistant to twisting or end movement. As a result the cutter bar may slide toward or against the reel with little difficulty but can not move in any other direction.

A threaded aperture 29 is formed in the vertical flange 24, this aperture extending through the flange 25 as illustrated in Figure 4 if it is so desired. The aperture 29 is threaded to accommodate an adjustment member in the form of a cap screw 30 or similar adjusting member. The cap screw 30 may be provided with a multi-sided or socketed head if preferred. By rotating the cap screw 30 the cutter bar 21 may be allowed to move closer to or farther from the cutting reel 32.

A lug 33 extends inwardly from each end plate 10 and is drilled to accommodate the shank of the cap screw 30. Washers 34 and 35 freely encircle the shank of the cap screw 30 and lie against the flange 24 of the cutter bar and the lug 33 respectively. A spring 36 is provided between the washers 34 and 35 to urge the cutter bar inwardly toward the cutting reel. Thus as the cap screw 30 is rotated in one direction the spring 36 elongated to urge the cutter bar toward the reel. Rotation of the cap screw 30 in the opposite direction acts to compress the spring 36 and to move the cutter bar 21 away from the reel.

Along the inner surface of each end plate 10 I provide a pair of spaced guide ribs 37 and 39 for guiding the movement of the roller bracket 40. These ribs 37 and 39 are preferably equally spaced throughout their length and form a guide channel within which the arcuate bracket 40 may slide. The bracket 40 is provided with an elongated slot 41 therein through which a bolt or cap screw 42 extends for holding the bracket 40 in adjusted position relative to the end plate 10. The member 42 may extend through an aperture in the end plate 10 and be provided with a nut on its outer extremity or may extend into a threaded aperture in the end plate 10 if preferred.

The bracket 40 is provided with a stub shaft 43 projecting inwardly from its lower end thereof. This stub shaft 43 extends into a suitable aperture on the end of the roller 44 to support the roller. As one bracket 40 is provided on each end plate and as the stub shafts 43 both project inwardly the roller 44 may be readily supported therebetween.

An arm 45 is mounted on the lower extremity of the bracket 40 to project upwardly and rearwardly therefrom. An aperture 46 extends therethrough connected by a slot 47 to the upper edge of the arm. Thus the arm 40 provides a hook shaped member for receiving the forward edge of a grass catcher or the like. It will be noted that the forward edge of the grass catcher is then always located in proper relation relative to the roller 44.

The operation of my lawn mower is believed obvious from the foregoing description. The cutter bar 21 is adjusted by merely rotating the cap screws 30 until the cutting edge 23 of the cutter bar is in proper relation to the blades of the cutting reel. The springs 36 hold the cutter bar in this position during any normal operation of the law mower. However, should an obstacle tend to become wedged between the cutter bar 21 and the cutting reel, the springs 36 may compress sufficiently to prevent damage either to the cutter bar or to the reel and in some instances will permit the obstruction to pass between the reel and the cutter bar without greatly effecting the cutting operation.

In accordance with the patent statutes, I have described the principles of construction and operation of my lawn mower, and while I have endeavored to set forth the best embodiment thereof I desire to have it understood that obvious changes may be made within the scope of the following claims without departing from the spirit of my invention.

I claim:

1. A lawn mower including a pair of end members, a cutter reel rotatably supported therebetween, a cutting bar slidably supported by said end members for movement toward or away from said reel, means on said end members slidably supporting said bar and holding it from rotation, resilient means urging said cutter bar toward said reel, and adjustable means for limiting the movement of said cutter bar toward said reel.

2. A lawn mower including a pair of end members, a cutter reel rotatably supported therebetween, a cutting bar, means on said end members for slidably supporting said cutting bar for movement toward or away from said reel, means on said end members slidably supporting said bar and holding it from rotation, resilient means urging said cutter bar toward said reel, and means for limiting the movement of said cutting bar toward said reel.

3. A lawn mower including a pair of end members, a cutting reel rotatably supported between said end members, a pair of parallel slide guides secured to each of said end members, a cutting bar supported between said end members and slidable between the slide guides on each member, said guides holding said bar from rotation, said cutting bar being substantially triangular in cross section and having a projecting cutting edge, and laterally projecting slides on the ends of said cutting bar substantially filling the space between said guides.

4. The structure described in claim 3 and including means for adjusting the cutter bar toward and away from said cutting reel.

5. The structure described in claim 3 in which the slide guides are secured in fixed relation to said end members.

HERBERT F. DALGLISH.

REFERENCES CITED

The following references are of record in the file of this patent:

UNITED STATES PATENTS

| Number | Name | Date |
|---|---|---|
| 1,029,168 | Brown | June 11, 1912 |
| 1,437,434 | MacKenzie | Dec. 5, 1922 |
| 1,437,508 | Fletcher | Dec. 5, 1922 |
| 1,537,850 | Magoon | May 12, 1925 |
| 1,608,574 | Able | Nov. 30, 1926 |
| 1,724,879 | Kachel | Aug. 13, 1929 |
| 1,945,582 | White | Feb. 6, 1934 |
| 2,119,874 | Braun | June 7, 1938 |
| 2,126,139 | Roseman | Aug. 9, 1938 |
| 2,260,297 | Clemson | Oct. 28, 1941 |